C. F. GARMAN.
APRICOT CUTTER.
APPLICATION FILED MAY 10, 1920.
1,365,166.
Patented Jan. 11, 1921.
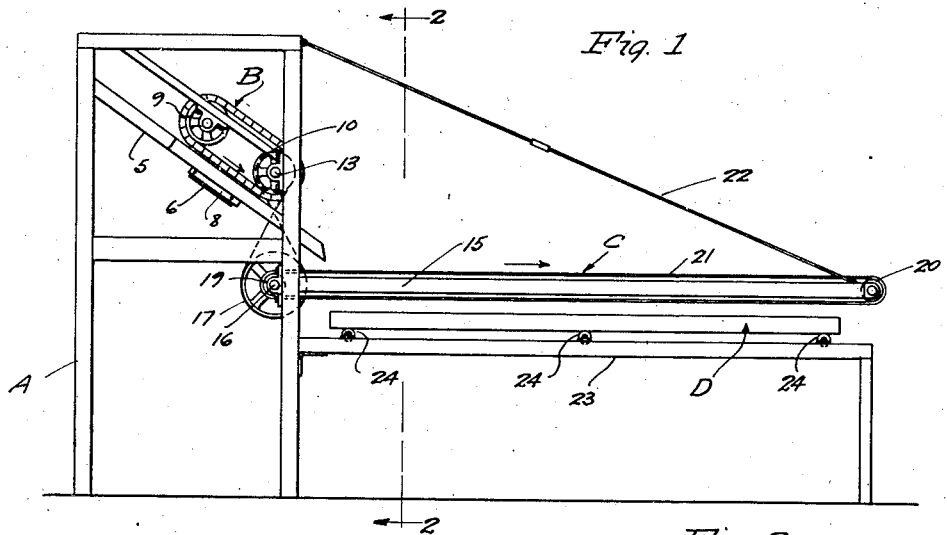
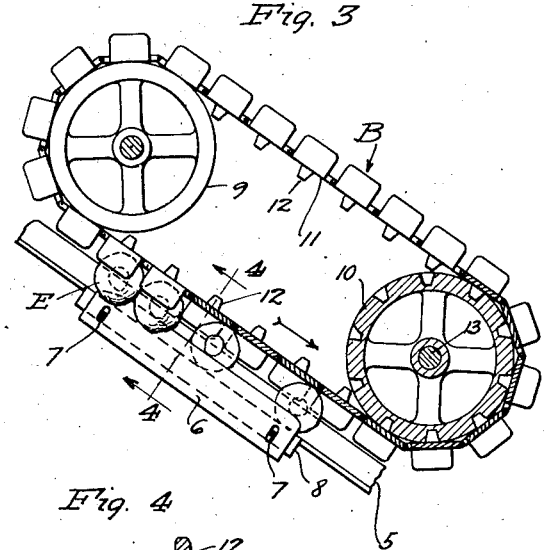
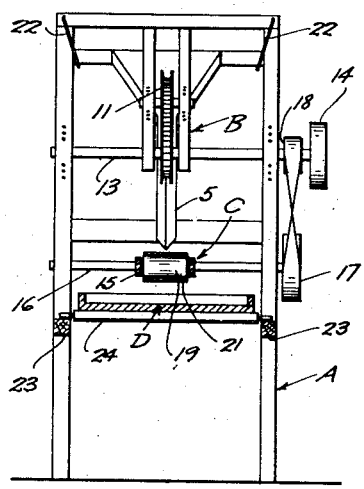
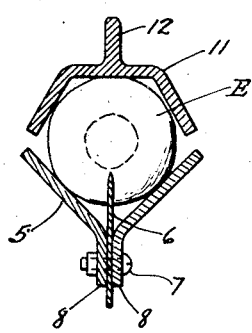
Inventor
Charles F. Garman
by Westall and Wallace
his Attorneys

UNITED STATES PATENT OFFICE.

CHARLES F. GARMAN, OF VENTURA, CALIFORNIA.

APRICOT-CUTTER.

1,365,166.  Specification of Letters Patent.  Patented Jan. 11, 1921.

Application filed May 10, 1920. Serial No. 380,040.

*To all whom it may concern:*

Be it known that I, CHARLES F. GARMAN, a citizen of the United States, residing at Ventura, in the county of Ventura and State of California, have invented new and useful Improvements in Apricot-Cutters, of which the following is a specification.

This invention relates to a mechanism adapted to cut or split fruit having pits, thereby placing the fruit in condition for extraction of the pits.

In conserving fruit having pits, it is the present practice to prepare the same by cutting the meat around the pit so as to divide the fruit in halves, then for the pitter to break open the fruit and extract the pits with his or her fingers. With soft fruit, such as apricots, the fruit is often crushed and bruised during the pitting operation. Such work is commonly performed manually and the time required and expense thereof is considerable. Moreover, the fruit must be handled while ripe and the securing of a sufficient number of pitters immediately upon ripening of the fruit is a problem difficult of solution. It is the primary object of my invention to provide a machine to cut the fruit and deliver it to the pitters, who may break open the cut fruit and extract the pits. Another object of this invention is to provide a machine, in which the fruit is continuously operated upon. This invention depends primarily upon the principle of rolling fruit over a knife.

These objects will be more fully understood, as will also other objects and corresponding accomplishments of my invention, from the following detailed description of a preferred embodiment thereof. For the purpose of this description, reference is had to the accompanying drawing, in which:

Figure 1 is a side elevation of the parts of a machine essential to my invention; Fig. 2 is a section as seen on the line 2—2 of Fig. 1; Fig. 3 is an elevation partly in median section on an enlarged scale showing details of the carrier, chute, and knife; and Fig. 4 is an enlarged section as seen on the line 4—4 of Fig. 3.

Referring more particularly to Figs. 1 and 2, a framework of any suitable construction is indicated by A. Mounted therein is the cutting mechanism indicated generally by B. An endless conveyer is disposed beneath the discharge end of the cutting mechanism for receiving cut fruit and is indicated generally by C. Disposed beneath the conveyer is a tray indicated by D for receiving the pitted fruit.

Referring more particularly to the details of this construction, a V-shaped chute 5 is disposed in the frame inclining downwardly so that fruit will tend to travel downwardly in the chute by gravity. The chute is constructed with an opening to receive a knife blade 6, which extends upwardly in the middle thereof. Means are provided for adjusting the height of the knife edge in conformity with the size of the fruit to be cut and the size of the pit. The knife blade should be so arranged that the cutting edge thereof will extend through the meat of the fruit and to the pit, as best shown in Figs. 3 and 4, the fruit being indicated by E. The knife blade is provided with elongated openings through which extend bolts 7, the bolts passing through openings in flanges 8 on the chute. The mode of adjustment is obvious from the construction shown.

Journaled in the framework above the chute are sprocket wheels 9 and 10. These sprocket wheels are preferably provided with shrouds to maintain a chain 11 therein. In the construction shown herein, the chain is composed of links in the form of open ended troughs. These links are arranged to travel over the chute 5 and parallel thereto for a distance, embracing the fruit E. In order to provide a positive drive for the carrier, each link is provided with a tooth 12 to engage with the spaces between the teeth on the sprocket wheels 9 and 10. However, I do not confine myself to this particular type of carrier, or the particular means for driving the same. Sprocket wheel 10 is mounted upon a shaft 13 journaled in the frame and having a pulley 14 serving as a drive pulley. Pulley 14 may be geared to any suitable motor, or the mechanism may be driven manually.

A frame 15 is pivotally mounted upon a shaft 16 journaled in the frame A. Fixed to one end of the shaft 16 is a pulley 17 belted to a pulley 18 fixed to shaft 13. Thus, shafts 13 and 15 are driven from the pulley 14. Fixed to shaft 16 is a roller 19, and journaled in the opposite end of frame 15 is an idler roller 20. An endless conveyer belt 21 is passed over rollers 19 and 20. It is evident that rotation of shaft 16 will drive the conveyer belt. The frame 15 is supported horizontally at its outer end by means of stay cables 22.

Extending below the conveyer and parallel thereto are rails 23 having rollers 24 journaled thereon. A tray D may be placed upon the rollers underneath the conveyer which is not as wide as the tray. The rollers provide for easy removal of full trays and replacement by empty trays.

Apricots or similar fruit are fed to the chute 5 by any suitable means, such as a hopper, not shown. The fruit roll downwardly in the chute, until engaged by the carrier. The carrier then rolls the fruit along the chute and over the knife. A cut completely around the fruit extending to the pit and dividing the fruit in halves is made by the rolling action. The fruit is discharged from the chute falling upon the conveyer belt 21. The fruit drops from the chute upon the conveyer belt, and pitters who stand upon either side of the belt pick up the fruit, break it and extract the pits. The pits are dropped by the pitters upon the conveyer belt and carried to the discharge end thereof. The pitted fruit is placed in the trays by the pitters, and when the trays are full, they are withdrawn and empty ones inserted.

What I claim is:

1. In a device of the class described, the combination of a straight way, a knife secured therein with its exposed edge extending longitudinally thereof to engage fruit or the like rolling therealong, and an endless belt carrier disposed with one side parallel to said way for rolling fruit therealong and over said knife.

2. In a device of the class described, the combination of a chute having sides converging toward the bottom, a knife adjustably secured in the center of said chute and projecting thereinto with its exposed edge extending longitudinally thereof to engage fruit or the like rolling therealong, and a flexible belt carrier disposed with one said parallel to said chute for rolling fruit therealong and over said knife.

3. In a device of the class described, the combination of a chute having sides converging toward the bottom, a knife adjustably secured in the center of said chute with its exposed edge extending longitudinally thereof to engage fruit or the like rolling therealong, and an endless flexible carrier with side flanges to embrace said fruit for rolling the latter therealong over said knife.

In witness that I claim the foregoing I have hereunto subscribed my name this 1st day of May, 1920.

CHARLES F. GARMAN.